L. G. GINNETT.
SHOCK ABSORBER.
APPLICATION FILED DEC. 5, 1913.
1,169,027.
Patented Jan. 18, 1916.
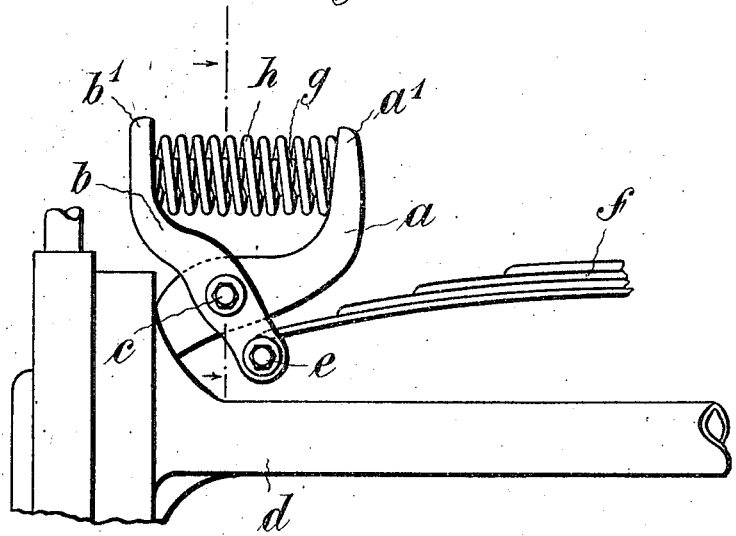
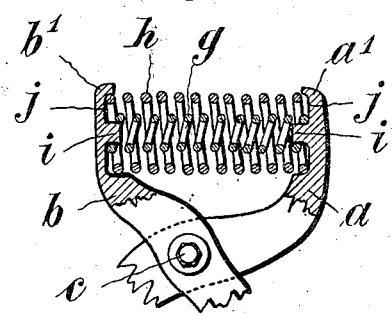
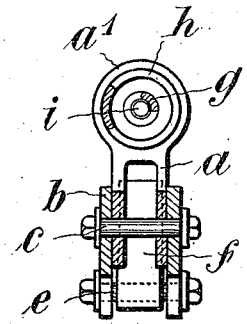
Witnesses.
A. R. Wolfe.
Francis T. Boswell.
Lucien G. Ginnett,
By D. Swift & Co.
his Attys.

UNITED STATES PATENT OFFICE.

LUCIEN GULES GINNETT, OF LONDON, ENGLAND.

SHOCK-ABSORBER.

1,169,027.　　　　　Specification of Letters Patent.　　Patented Jan. 18, 1916.

Application filed December 5, 1913. Serial No. 804,893.

*To all whom it may concern:*

Be it known that I, LUCIEN GULES GINNETT, engineer, of 330 Kennington road, London, S. E., England, a subject of the King of Great Britain, have invented a new Shock-Absorber; and I do hereby declare the following to be a full, clear, and exact description of the invention, such as will enable others skilled in the art to which it appertains to make and use the same.

This invention relates to improvements in shock absorbers for motor and other road vehicles of the kind wherein duplicate spiral springs are employed and the present invention consists in the formation and arrangement of parts as hereinafter set forth.

Referring to the accompanying drawings:—Figure 1 shows the general arrangement of the spring controlling device. Fig. 2 shows the said spring controlling device in section, and Fig. 3 is a cross section of the same.

In carrying this invention into practical effect, two levers $a$ and $b$ are pivotally connected as at $c$ the lever $a$ being rigidly secured to a suitable part of the axle $d$ of the vehicle while the lower extremity $e$ of the lever $b$ is connected with the ordinary cambered spring $f$ of the vehicle, it being understood that the shock absorbing device is disposed and arranged at each side of the said vehicle.

Between the upper extremities $a'$ and $b'$ of the aforesaid levers, two spiral springs $g$ and $h$, one passing through the other, are located the inner spring $g$ which necessarily is the smallest, being supported upon studs $i$ while the extremities of the outer or longer spring $h$ take a bearing in recessed portions $j$ of the aforesaid levers.

The weight of the vehicle is designed to be borne by the cambered spring $f$ and upon the same being depressed by any shock or obstruction in the course of the path of the vehicle, the lever $b$ is turned and compresses the aforesaid springs $g$ and $h$ whereby the aforsaid shock absorbing device is brought into effective operation.

What I do claim as my invention, and desire to secure by Letters Patent is:—

A shock absorber for motor and other vehicles comprising two levers, a stationary lever and a pivotally movable lever, each comprising a substantially vertical portion and a lower forked portion extending toward and intersecting the lower forked portion of the opposite lever, the forked portion of one being between the forks of the other, both forked portions extending near forty-five degree angles across one another, means for pivoting the forked portions together, the lower extremity of the forked portion of one lever being secured to a part of the axle of the vehicle, the lower extremity of the other forked portion being secured to the chambered end of the vehicle spring, so that when the spring is depressed the movable lever will pivot toward the stationary lever, the opposite faces of the substantially vertical portions being provided with sockets having concentric lugs therein, said sockets and the lugs being axially alined and directly opposite, a pair of helical springs, one arranged within the other, the inner spring engaging said lug of said sockets, the outer spring engaging within the peripheral flange of the socket, as set forth.

In testimony whereof I have signed my name to this specification in the presence of two subscribing witnesses.

LUCIEN GULES GINNETT.

Witnesses:
ERNEST HENRY REEVES,
R. WESTACOTT.